United States Patent

[11] 3,555,205

[72] Inventor Moghazi F. Barkouki
Palo Alto, Calif.
[21] Appl. No. 710,537
[22] Filed Mar. 5, 1968
[45] Patented Jan. 12, 1971
[73] Assignee Mo.̈ark Instruments Corporation
Sunnyvale, Calif.
a corporation of California. by mesne assignment

[54] APPARATUS FOR SCANNING TWO SETS OF ANGULARLY DISPOSED OBLIQUE TRACKS ON A MAGNETIC MEDIUM
14 Claims, 4 Drawing Figs.

[52] U.S. Cl. .......... 179/100.2, 178/6.6
[51] Int. Cl. .......... G11b 5/52, G11b 21/04, H04n 1/24
[50] Field of Search .......... 179/100.2T; 178/6.6A

[56] References Cited
UNITED STATES PATENTS
3,402,257 9/1968 DeLange .......... 178/6.6
3,157,738 11/1964 Okamura .......... 179/100.2

*Primary Examiner*—J. Russell Goudeau
*Attorney*—Townsend and Townsend

ABSTRACT: Apparatus and a method for recording and reproducing a pair of electronic signals on a movable, flexible magnetic tape wherein the tape is helically looped about the circular paths of travel of a pair of rotatable transducers and is disposed to cause the transducers to scan relatively angularly disposed tracks on the tape, whereby the tracks for the two signals will be arranged in crisscross fashion as the transducers rotate and as the tape moves in a predetermined direction. The apparatus and method are suitable for recording and reproducing the chrominance and luminance signals of a video transmission.

PATENTED JAN 1 2 1971

3,555,205

INVENTOR.
MOGHAZI F. BARKOUKI
BY Townsend and Townsend
ATTORNEYS

APPARATUS FOR SCANNING TWO SETS OF ANGULARLY DISPOSED OBLIQUE TRACKS ON A MAGNETIC MEDIUM

This invention relates to improvements in tape transports and, more particularly, to apparatus and a method for recording and playing back recorded signals on a moving magnetic tape.

The present invention is directed to the concept of utilizing more fully the recordable portion of a moving magnetic tape and finds a particular application in the recording and playing back of the chrominance and luminance signals of a video transmission. According to the teachings of the present invention, a magnetic tape and a pair of transducers can be arranged in a manner such that two separate and distinct electronic signals can be recorded on and played back from the tape even though the signals are placed on the tape in a crisscross fashion so that they intersect each other. The phenomena which makes this arrangement possible is that the randomly oriented magnetic particles in the magnetizable coating of a magnetic tape are not completely oriented, when a signal is applied to the tape, along the direction of the applied signal. Some of the magnetic particles or domains remain in their randomly distributed state so that they are available to be oriented in another direction by the application of a second signal to the tape. This feature allows for a pair of electronic signals, such as the chrominance and luminance signals of a video transmission, to be applied to the tape along angularly disposed tracks, whereby a large number of such signals can be arranged obliquely of the tape itself to thereby provide for maximum utilization of the magnetizable part of the tape itself.

In the past, conventional video tape recorders generally recorded the chrominance and luminance signals in the same track but at different wavelengths. A disadvantage of this technique is the requirement of a wideband capability for the tape recorder which necessitates a relatively high recording speed. Another way of recording the chrominance and luminance signals is to place them on parallel tracks of the tape by two different heads. This way of handling such signals results in reducing the amount of available tape area for recording purposes.

By recording a pair of electronic signals on a tape in a crisscross fashion, the present invention permits more effective utilization of the available working area of a magnetic tape and this can be accomplished without effecting the signal strength due to the intersections of the two signals. While there will be some reduction in signal strength, it will not be great enough to seriously affect the reproduction of the signals. The tape recording speed can, as a result, be at a minimum value and sufficient to achieve quality video recording and reproduction in color.

The primary object of this invention is to provide improvements in apparatus and a method for recording a pair of electronic signals in a crisscross fashion on a moving magnetic tape to utilize the available tape working area to a maximum while providing a quality reproduction of the signals after they have been recorded on the tape.

Another object of this invention is to provide apparatus and a method of the type described which permits the chrominance and luminance signals of a video transmission to be recorded in crisscross fashion on a magnetic tape to permit quality reproduction of such video transmission while avoiding the necessity of placing these two signals on parallel tracks of the tape or on the same tape track but at different wavelengths.

Still another object of this invention is to provide a tape recording apparatus and method wherein a pair of separate and distinct electronic signals are placed on a tape when the latter is helically looped about the circular paths of travel of a pair of rotatable transducers and oriented to cause the signals to be recorded along relatively angularly disposed tracks when the transducers scan the tape, whereby the positioning of the signal tracks utilize the effective working area of the tape to a maximum.

Other objects of this invention will become apparent as the following specification progresses, reference being had to the accompanying drawings for various illustrations of the invention.

Figures 1, 2, 3:
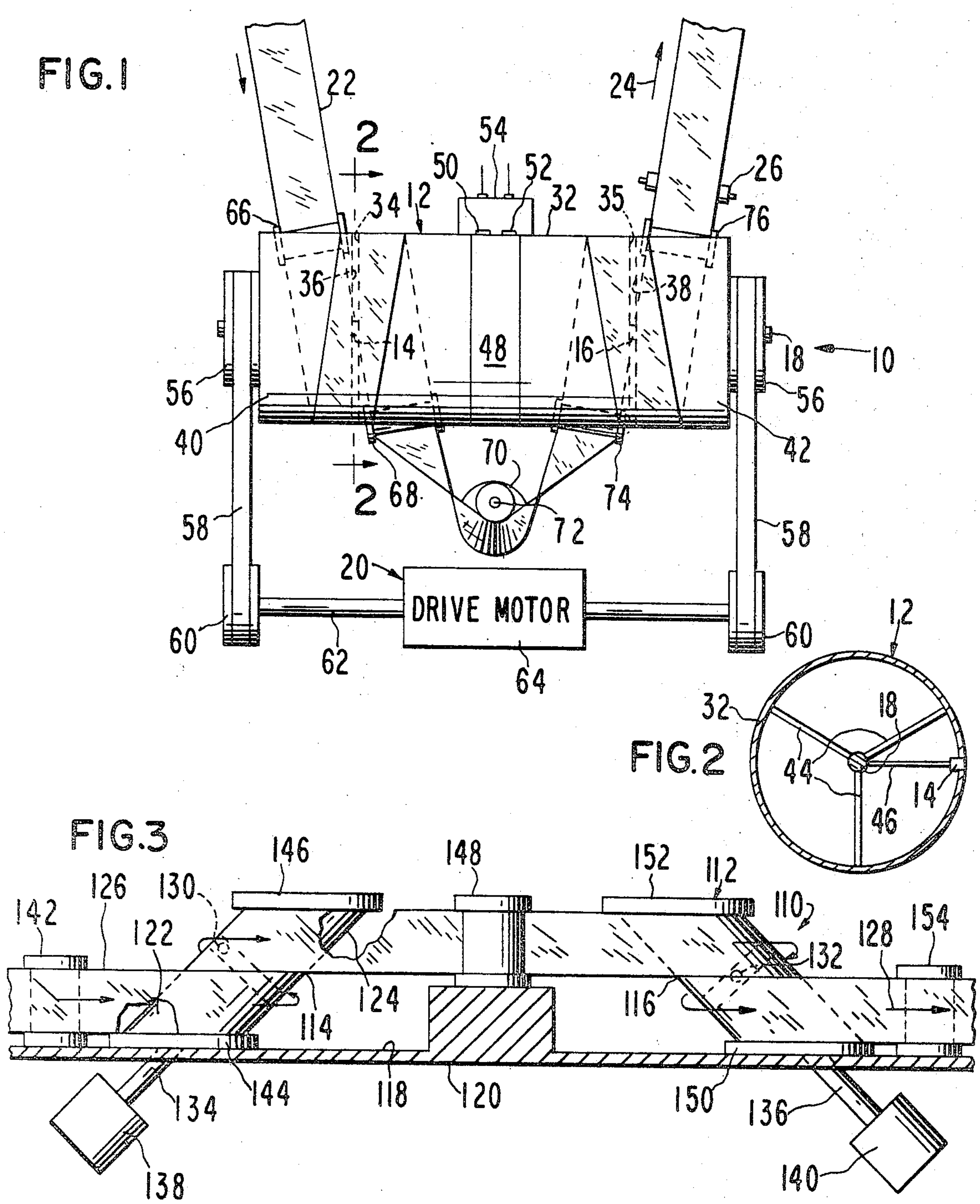
FIG. 1 is a side elevational view, partly in block form, of one embodiment of the apparatus.
FIG. 2 is a cross-sectional view taken along line 2–2 of FIG. 1.
FIG. 3 is a side elevational view of a second embodiment of the apparatus.
Figure 4:
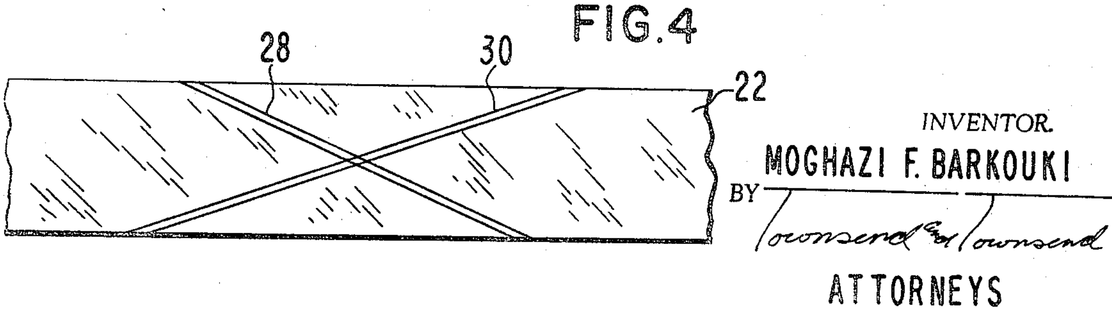
FIG. 4 is a side elevational view of one face of a magnetic tape having a pair of angularly disposed tracks thereon.

The first embodiment of the apparatus of this invention is broadly denoted by the numeral 10 and includes cylindrical drum structure 12 adjacent to a pair of rotatable transducers 14 and 16 coupled to a rotatable shaft 18 coaxial with the axis of drum structure 12. Power means 20 coupled with shaft 18 effects rotation of transducers 14 and 16 about respective circular paths adjacent to drum structure 12. A movable, flexible magnetic tape 22 extends or is looped about drum structure 12 at a pair of locations in helically disposed relationship to the circular paths of travel of transducers 14 and 16. The tape is advanced relative to drum structure 12 in the direction of arrow 24 by a rotatable capstan 26 coupled in any suitable manner to a power source (not shown). As the tape moves past drum structure 12 during a recording mode, transducers 14 and 16 scan the tape and apply respective signal tracks 28 and 30 on the magnetizable face of tape 22. During a playback mode, the transducers scan the tape in the same manner and pick up the signals from tracks 28 and 30 and direct them to electronic equipment for readout purposes.

For each revolution of a transducer, a signal track will be recorded on the tape or scanned by the transducer. For a number of revolutions of the transducers, there will be a set of parallel tracks 28 and a set of parallel tar tracks 30, all the tracks 28 being angularly disposed relative to each track 30. This manner of arranging the tracks more economically utilizes the recording area of the tape than is possible with conventional tape recording apparatus and techniques. Thus, the present invention provides an improved apparatus and method for tape recording video signals wherein the chrominance and luminance signals of a video transmission must be recorded separately. When used for recording and reproducing these signals, apparatus 10 records the chrominance signal on a plurality of tracks 30. The helical disposition of tape 22 on drum structure 12 assures that tracks 28 and 30 are oblique to the longitudinal axis of the tape. Also, the linear speed of the transducers is generally greater than that of the tape, whereby the tape tracks will make a relatively shallow angle with the tape longitudinal axis to thereby maximize the length of the tracks.

Drum structure 12 includes a central section 32 having a pair of opposed outer edges 34 and 35 which are proximal to and spaced from corresponding end edges 36 and 38 of end drum sections 40 and 42, respectively. Edges 34 and 36 are opposite sides of the circular path of transducer 14, and edges 35 and 38 are on opposite sides of the circular path of transducer 16. Central section 32 is secured to shaft 18 by radial arms 44 or other suitable structure, whereby section 32 rotates with shaft 18. Similarly, each transducer is secured by an arm 46 to shaft 18 so that the transducers and section 32 move as a unit. In the alternative, each transducer could be mounted on the proximal end edge of section 32 to avoid the necessity of a pair of arms 46.

Section 32 has a centrally disposed, generally continuous band 48 of magnetizable material to simulate a segment of a magnetic tape. The purpose of band 48 is to receive and play back a signal of short duration. To this end, a pair of transducers 50 and 52 mounted on a suitable support 54 adjacent to section 32 are coupled to transducers 14 and 16, respectively, and are utilized to record and play back the signals on band 48. The recording by transducers 50 and 52 will preferably be done during the playback mode of transducers 14 and 16, whereby the signal recorded on band 48 will provide an effective stop-action of a particular scene or image.

End sections 40 and 42 of drum structure 12 are fixed in any suitable manner to a support so that they are stationary with respect to rotatable drum section 32. Shaft 18 is coupled by bearings (not shown) tc sections 40 and 42.

For purposes of illustration only, power means 20 includes a pair of pulleys 56 secured to the ends of shaft 18 and a pair of endless flexible belts 58 interconnecting pulleys 56 with respective pulleys 60 mounted on the rotatable drive shaft 62 of a drive motor 64. The purpose of this construction is to cause the ends of shaft 18 to be driven simultaneously so that the transducers 14 and 16 will be properly in phase with each other and with respect to the tape 22 at all times.

Tape 22 is adapted to be coupled to supply and takeup reels (not shown) and the tape is guided toward and onto drum section 40 from the supply reel by a first guide roller 66 having a central axis inclined relative to the axis of drum structure 12. By means of roller 66, the tape is allowed to move onto drum structure 12 at an angle and thereby be helically disposed about the path of travel of transducer 14. Thus, a first tape stretch is wrapped about and overlaps end section 40 and the proximal end of section 32 and is disposed in a position to be scanned by transducer 14 as the latter rotates with shaft 18. The tape makes a complete 360° wrap about drum structure 12 so that it forms a loop about the circular path of travel transducer 14. The tape extends outwardly from drum structure 12 and past a second guide roller 68 and onto and partially about a conical guide roller 70 having a shaft 72 which is substantially perpendicular to shaft 18. The tape engages the conical outer surface of roller 70 so that the tape will effectively be changed in direction and will be directed once again onto drum structure 12 from a different direction. Structure other than a conical guide roller can be used to achieve the same purpose.

A third flanged guide roller 74 guides the tape helically onto the portion of the drum defined by end section 42 and the proximal end portion of central section 32, whereby a second stretch of the tape forms a 360° wrap about the drum structure 12. The tape thus forms a loop about the circular path of travel of transducer 16. Thus, the tape is in a position to be scanned by transducer 16. The tape leaves drum structure 12 and past a fourth flanged roller 76 which is substantially parallel to roller 74. The tape then engages capstan 26 and is directed outwardly therefrom and onto the takeup reel.

Drive motor 64 is provided with some suitable control (not shown) for actuating the same. Similarly, the drive means for capstan 26 can be controlled so that it will drive the tape past drum structure 12.

In the practice of the method of the invention with respect to apparatus 10, the tape is manually fed about drum structure 12 in the manner shown in FIG. 3 so that it can move relative thereto when capstan 26 is actuated. Transducers 14 and 16 will be coupled to a source of electronic signals so that the latter can be recorded on the tape.

Drive motor 64 is placed in operation so that shaft 18 is caused to rotate and thereby cause transducers 14 and 16 to move in scanning relationship to the tape. Capstan 26 is then caused to drive the tape from the supply reel in a direction toward the takeup reel and the speed of movement of the tape will be less than the linear speed of transducers 14 and 16.

The transducers will record tracks 28 and 30 on tape 22 for each revolution of shaft 18 so that, for a series of shaft revolutions, a plurality of tracks 28 and 30 will be formed on the tape. For playback purposes, the tape can again be played out from the supply reel and past transducers 14 and 16, whereby the signals are picked up by the transducers and directed to electronic apparatus and equipment for playback purposes.

The apparatus 10 is especially adapted for recording and reproducing the chrominance and luminance signals of a video transmission wherein the signals can be arranged in the manner shown in FIG. 3 without any substantial loss in the content of the signals. The junctions of signals 28 and 30 are not completely magnetized in one direction. For instance, the magnetic domains at the intersection of tracks 28 and 30 will partly be oriented to track 28 and partly oriented with respect to track 30. The reasons for this can be set forth in the following paragraphs.

When tape 22 is completely erased, it has randomly oriented magnetic domains and when the tape passes the magnetic field of a transducer, the tape is recorded, which means that at least certain of the randomly oriented domains are rotated into the direction parallel to that of the magnetic field of the transducer, i.e., across the head gap of the transducer. The number of magnetic domains that rotate in this manner is a function of the physical and magnetic characteristics of the magnetic particles that form the oxide coating on the tape. This number is also a function of the magnitude of the magnetic field of the transducer which, in turn, is a function of the electrical current flowing through its winding.

It is well known in the art of video tape recording that optimum recording is achieved with less head current than is necessary to saturate the tape. Saturating the tape means that all of the magnetic domains have rotated with the magnetic field of the transducer. The optimum recording condition, therefore, indicates that a certain percentage of the magnetic domains in the same area of the tape still retain random magnetization when video signals are recorded on the tape.

When the tape travels relative to the transducer head gap, some of the magnetic domains will retain their original orientation; that is, their remanence magnetization. A track of permanently magnetized domains is, however, created by this tape travel relative to the head gap and the direction of this track is the same as the direction of the tape travel relative to the transducer. Since the tape is wrapped obliquely around the scanning transducer, as shown in FIG. 1, with the magnetic head rotating normal to the axis of the scanning assembly, the track applied to the tape will be at an oblique angle with respect to the longitudinal axis of this tape.

The areas of track 28 are composed of a certain number of magnetic domains; whereas, the areas of track 30 in this same region are composed of other magnetic domains that are in the guard bands between the various domains oriented along the first track 28. By properly selecting the angle between the two sets of track 28 and 30, the second set of tracks 30 affect mostly the randomly magnetized domains in the common areas of the tape rather than the domains magnetized in the direction of tracks 28. The ideal angle is 90° since the statistical resultant of these random magnetic domains is normal to the first set of tracks 28.

There are practical limitations to the choice of the angle between tracks 28 and 30 since it is determined by the geometry of the scanning assemblies and by the width of the tape used. Choice of angles other than 90° will result in interaction between domains magnetized in either direction. Optimum geometry of the scanning assembly could be chosen such that this interaction could be minimized. However, this interaction will affect mostly the magnitude of the signals recorded on the tape. If the signals are recorded in an angular modulation form, which is primarily the case in video tape recording, the magnitudes of the carriers rather than their phases will be affected. By the use of limiters during reproduction of the recorded signals, the demodulated video will suffer much less from such interaction.

The system of rotating transducers 14 and 16 as shown in FIG. 1 eliminated any problems of timing the rotation of the transducers since they have the same axis of rotation and the same means for rotating them. The transducers therefore will be in exact synchronization at all times.

A second embodiment of the invention is broadly denoted by the numeral 110 and includes drum structure 112 comprised of a pair of drums 114 and 116 which are arranged in the manner shown in FIG. 2 and disposed angularly with respect to each other. The drums 114 and 116 are mounted on one face 118 of a support 120 in a manner such that the drums extend toward each other and have central axes which intersect each other at an angle. Preferably, this angle is 90°, but, as mentioned above, this will depend upon the tape width and the speed of the tape and the transducers.

Each of the drums 114 and 116 includes a pair of spaced drum sections 122 and 124 on opposite sides of the circular path of travel of a rotating transducer disposed for scanning tape 126 as the tape moves about the drums in the direction of arrow 128. Transducers 130 and 132 are provided for drums 114 and 116, respectively, the transducers being operably comparable to drive shafts 134 and 136, respectively for rotation relative to respective drums 114 and 116. Shafts 134 and 136 are coupled to drive motors 138 and 140, respectively, on the opposite side of support 120 from the drums. The transducers are secured in any suitable manner to their shafts, such as by arms in the manner shown in FIG. 2. The paths of the transducers are normal to the axes of respective drums 115 114 and 116 and the inclination of the drums with respect to entry and exit directions of tape 126 causes the tape, when the latter is wrapped about the drums to form a 360° wraps or loops, to be helically disposed relative to the circular paths of travel of the transducers. The transducers are close to the outer peripheral portions of drums 122 and 124 so that the transducers scan the tape when the tape is wrapped or looped about drums 114 and 116.

The geometry of drums 114 and 116 causes the transducers to scan oblique tracks of the tape in a manner such that the tracks will be oriented in the manner shown in FIG. 3. Thus, the track corresponding to transducer 130 will be angularly disposed relative to the track scanned by transducer 132.

The guide means form for moving the tape includes a first flanged roller 142, flanges 144 and 146 on drum 114, a second flanged roller 148, opposed flanges 150 and 152 on drum 116, and a third flanged roller 154 downstream of drum 116. The tape emanates from a supply reel and moves onto a takeup reel by actuation of capstan, the reels and capstan not being shown in FIG. 3. The capstan will preferably be placed in a location downstream of drum 116 and, to this end, role roller 154 could represent the capstan if necessary.

In the practice of the method of the invention with respect to apparatus 110, the tape is wrapped around drums 114 and 116 in the manner shown in FIG. 2 and motors 138 and 140 are energized to commence rotation of the transducers. If it is desired to record on the tape, the capstan for the tape is energized so that the tape is caused to move in the direction of arrow 128. Simultaneously then, transducers 130 and 132, coupled to a signal source or sources, will apply signal tracks similar to tracks 28 and 30 to the tape. For continued rotation of the transducers, a series of parallel tracks 28 and a series of parallel tracks 30 will be placed on the tape by transducers 130 and 132, respectively, The areas of intersection of adjacent tracks 28 and 30 will be oriented magnetically according to the specific tracks so that not all of the magnetic domains will be oriented in the direction of track 28. Some of the magnetic domains will be oriented in the direction of track 30. Thus, there will not be a complete loss of signal strength on the various signal tracks due to the crisscross relationship of the two tracks.

The apparatus of FIG. 3 is, like the apparatus of FIG. 1, suitable for video recording and reproducing wherein the chrominance and luminance tracks are applied by transducers 130 and 132 to the tape. A partial erasure of the luminance track will occur when the chrominance track is recorded and the erasure effect will reduce in proportion to the angle between the luminance and chrominance tracks. The choice of the track angle for the least amount of erasure would be optimized with the proper choice of magnetic tape and the orientation of its magnetic particles. By recording the luminance, using a form of angular modulation, the effect of the partial erasure due to the subsequent recording of the chrominance tracks will have less effect on luminance information itself.

While several embodiments of this invention have been shown and described, it will be apparent that other adaptations and modifications of this device can be made without departing from the true spirit and scope of the invention.

I claim:

1. In a tape transport: a pair of transducers; means coupled with said transducers form for mounting the same for rotation along respective, spaced paths; means coupled with said transducers for applying thereto respective signals to be recorded; a flexible tape; and means adjacent to said paths for mounting a pair of spaced stretches of the tape in at least partially wrapped relationship about respective transducer paths with the stretches being disposed helically along said paths and in positions to be scanned by respective transducers along relatively angularly disposed tracks thereon, whereby the signals will be recorded on said tape and the tracks will be oblique to the longitudinal axis of the tape.

2. A tape transport comprising: a movable magnetic tape; a pair of transducers; means mounting said transducers for rotation along respective paths; drum structure adjacent to said paths and disposed to position a pair of spaced portions of the tape in at least partially wrapped relationship about the paths of respective transducers with the tape portions being helically disposed relative to the paths and in proximity to the transducers to cause the latter to scan the tape along oblique tracks of respective tape portions and with the tracks scanned by a first of said transducers being angularly disposed with respect to the tracks scanned by the second of said transducers; means adapted to be coupled with said transducers for applying thereto respective signals to be recorded on said tape; means adapted to be coupled with said transducers after said signals have been recorded on said tape for playing back said signals; means coupled with the transducers for rotating the same relative to said tape; and means coupled with the tape for moving the same relative to said transducer paths.

3. In a tape transport: a pair of transducers; drum structure having a pair of outer peripheral portions for each transducer respectively; means mounting said transducers for rotation relative thereto along respective circular paths adjacent to and between respective outer peripheral portions of said drum structure; means coupled with said transducers for applying thereto signals to be recorded; and means adjacent to said drum structure for guiding a flexible tape onto and in at least partially wrapped relationship about said outer peripheral portions of the drum structure with a pair of stretches of the tape being helically disposed adjacent to respective transducer paths and in positions to be scanned by the transducers, said transducers being disposed to cause the tracks on the tape scanned by a first of said transducers to be angularly disposed with respect to the tracks scanned by the second of said transducers.

4. A tape transport comprising: a pair of transducers; drum structure having a pair of outer peripheral portions for each transducer respectively; means mounting said transducers for rotation along respective circular paths adjacent to and between respective outer peripheral portions of said drum structure; a flexible tape; means adjacent to said drum structure and coupled with said tape for guiding the latter onto and in at least partially wrapped relationship about said outer peripheral portions of said drum structure with a pair of stretches of the tape being helically disposed adjacent to respective transducer paths and in positions to be scanned by the transducers as the latter rotate relative to said drum structure; means coupled with said transducers for rotating the same along said paths; means coupled with said transducers for simultaneously placing the same in a record mode; and means coupled to said tape for moving the latter relative to the drum structure, whereby the transducers move in scanning relationship to said tape stretches along oblique tracks thereon, said transducers being disposed to cause the tracks on the tape scanned by a first of said transducers to be angularly disposed with respect to the tracks scanned by the second of said transducers.

5. A tape transport as set forth in claim 4, wherein the drum structure includes a pair of drum sections for each transducer respectively, the drum sections being in end-to-end relationship with each other, said guide means being angularly disposed relative to the drum sections.

6. A tape transport as set forth in claim 5, wherein a drum section corresponding to one of the transducers is connected to a drum section corresponding to he the other transducer, said interconnected drum sections being coupled to said transducer rotating means for rotation therewith.

7. A tape transport as set forth in claim 5, wherein said guide means includes a rotatable member having a conical outer surface engaging a segment of the tape between said tape stretches.

8. A tape transport as set forth in claim 4, wherein said drum structure includes a number of coaxially aligned drum sections, said transducer rotating means including a shaft concentric with the drum sections, and power means coupled with the shaft for rotating the same.

9. A tape transport as set forth in claim 8, wherein said shaft has a pair of opposed ends, said power means including a structure coupled with the ends of the shaft for rotating the same.

10. A tape tar transport as set forth in claim 4, wherein said drum structure has a section rotatable with said transducers, said section having a band of magnetizable material thereon, and wherein is included a third transducer adjacent to and fixed relative to said band and disposed in scanning relationship thereto, said third transducer being coupled to one of the first mentioned transducers.

11. A tape transport as set forth in claim 4, wherein said drum structure includes a pair of generally cylindrical drums, the central axes of the drums being angularly disposed relative to each other, each drum having a pair of spaced, coaxial sections defining said outer peripheral portions.

12. A tape transport as set forth in claim 11, wherein each drum section has an outer continuous flange defining a part of said guide means, there being a shaft extending coaxially of the drum sections of each drum respectively, each transducer being coupled to and rotatable with the corresponding shaft, said rotating means being coupled to the shafts for rotating the latter and thereby said transducers.

13. A tape transport as set forth in claim 12, wherein the axes of said shafts are substantially perpendicular to each other.

14. A tape transport as set forth in claim 13, wherein the tape stretches form a 360° wrap about each drum, said moving means including a capstan coupled to the tape.